United States Patent
Burri et al.

(12)

(10) Patent No.: US 6,500,480 B1
(45) Date of Patent: Dec. 31, 2002

(54) PSYLLIUM HUSK PRODUCT

(75) Inventors: Josef Burri, Epalinges (CH); Claude Guex, Yverdon-les-Bains (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/671,605

(22) Filed: Sep. 28, 2000

(30) Foreign Application Priority Data

Oct. 8, 1999 (EP) .............................................. 99203295

(51) Int. Cl.[7] .................................. A23L 1/164
(52) U.S. Cl. ...................... 426/620; 426/516; 426/517; 426/518; 426/618; 426/619
(58) Field of Search ................................ 426/618, 619, 426/620, 516, 517, 518

(56) References Cited

U.S. PATENT DOCUMENTS

| | | | | |
|---|---|---|---|---|
| 5,223,298 A | * | 6/1993 | Wullschleger et al. ...... | 426/549 |
| 5,382,443 A | * | 1/1995 | Kincaid et al. ............. | 426/620 |
| 5,384,136 A | * | 1/1995 | Lai et al. ....................... | 426/19 |
| 5,384,144 A | * | 1/1995 | Bedard et al. .............. | 426/557 |
| 5,709,902 A | * | 1/1998 | Bartolomei et al. ........ | 426/619 |

FOREIGN PATENT DOCUMENTS

| | | | |
|---|---|---|---|
| EP | 0 105 195 | * | 8/1983 |
| EP | 0 144 644 | * | 10/1984 |

* cited by examiner

*Primary Examiner*—Helen Pratt
(74) *Attorney, Agent, or Firm*—Winston & Strawn

(57) ABSTRACT

The present invention relates to a psyllium husk containing intermediate product and a process to prepare intermediate product. The psyllium husk containing intermediate product contains a cooked-extruded mixture of from about 84 to 96% of psyllium husk, up to about 8% of oil or fat, up to about 10% of cereal bran, up to about 10% of vegetable binder, and up to about 1.5% of a stabilizer against oxidation. The invention also relates to a ready-to-eat cereal product containing psyllium husk containing the intermediate product and a process for manufacturing the ready-to-eat cereal product.

10 Claims, No Drawings

PSYLLIUM HUSK PRODUCT

FIELD OF THE INVENTION

The present invention relates to a psyllium husk containing intermediate product, a process for manufacturing the intermediate product, a ready-to-eat cereal product containing the intermediate product, and a process for manufacturing the ready-to-eat cereal product.

BACKGROUND ART

Psyllium is well known mucilaginous material obtained from the seeds of plants in the Plantago genus. Psyllium has found extensive use in bulk laxatives.

EP0105195 (Searle) discloses a process for sanitizing psyllium hydrophilic mucilloid by exposure to moist heat under elevated pressure in an extruder.

WO9507632 (Kellogg) discloses a ready-to-eat cereal having superior organoleptic properties that contains from about 6 to 19% by weight of extruded pre-wetted pure psyllium.

U.S. Pat. No. 5,223,298 (Kellogg) discloses a ready-to-eat cereal product obtained by admixing a precooked bulk cereal ingredient with an intermediate product which preferably contains about 75% psyllium and forming the mixture into shaped cereal pieces which contain about 2 to 30% by dry weight psyllium.

EP0144644 (Procter & Gamble) discloses an expanded high fiber bar made by a process comprising dry mixing about 10 to 80% by weight of psyllium mucilloid, about 10 to 30% by weight percent expander, and further dietary fiber from a grain source and extruding the mixture with water at a temperature of from 150 to 200° C.

There remains a need, however, for improved products that contain psyllium.

SUMMARY OF THE INVENTION

The invention relates to a psyllium husk intermediate composition that includes a cooked-extruded mixture of psyllium husk in an amount of from about 84 to 96 percent by weight of the psyllium husk intermediate composition, oil or fat in an amount of up to about 8 percent by weight of the psyllium husk intermediate composition, cereal bran in an amount of up to about 10 percent by weight of the psyllium husk intermediate composition, vegetable binder in an amount of up to about 10 percent by weight of the psyllium husk intermediate composition, and a stabilizer against oxidation in an amount up to about 1.5% by weight of the psyllium husk intermediate composition.

The oil or fat may be present in an amount of from about 3 to 8 percent by weight of the psyllium husk intermediate composition, the cereal bran may be present in an amount of from about 2 to 10 percent by weight of the psyllium husk intermediate composition, and the vegetable binder may be present in an amount of from about 2 to 10 percent by weight of the psyllium husk intermediate composition. The cereal bran may be wheat, barley, oat, rice bran, corn bran, bran concentrate, or a mixture thereof. The vegetable binder may be flour, starch, maltodextrin, a vegetable gum, or a mixture thereof. The stabilizer is preferably a phosphate such as disodium phosphate. Also, the psyllium husk intermediate composition may further include one or more additives selected from the group consisting of vitamins, minerals, sodium chloride, and antioxidants.

The invention also relates to a process for manufacturing a psyllium husk containing intermediate composition. The process involves combining and mixing 84 to 96 parts by weight psyllium husk, up to 8 parts by weight of an oil or fat, up to 10 parts by weight of a cereal bran, up to 10 parts by weight of a vegetable binder, up to 1.5 parts by weight of stabilizer against oxidation, and from about 24 to 45 parts by weight of water to form a mixture; cooking-extruding the mixture for from about 5 to 50 seconds at a temperature of from about 130° to 220° C. and a pressure of from about 10 to 18 MPa, to provide a strand or rope of expanded thermoplastic mass; cutting the strand or rope of expanded thermoplastic mass into pieces, and drying the pieces. The process may also include a step of rolling the cut pieces before they are dried to flake them. The pieces may be dried to a residual water content of from about 1 to 4 percent by weight of the psyllium husk containing intermediate composition.

The invention also relates to a ready-to-eat cereal product that contains agglomerated particles and/or flakes of the psyllium husk containing intermediate product of the invention, one or more cereal products, and milk solids coated with a syrup that includes sugar and an oil or fat. The one or more cereal products may be one or more of the whole grain, the germ, the bran, the flour, or starch derived from corn oats, whole wheat, barley, rice, and rye. The milk solids may be one or more of skim milk powder or demineralized whey. The sugar may be one or more of sucrose, dextrose, or fructose. The oil or fat may be one or more of palm kernel fat and coconut fat. The psyllium husk containing intermediate product may be present in an amount of from about from about 20 to 50 parts by weight of the ready-to-eat cereal, the one or more cereal products may be present in an amount of from about 20 to 50 parts by weight of the ready-to-eat cereal, the milk solids may be present in an amount of from about 5 to 15 parts by weight of the ready-to-eat cereal, the sugar may be present in an amount of from about 15 to 40 parts by weight of the ready-to-eat cereal, and the oil or fat may be present in an amount of from about 10 to 30 parts by weight of the ready-to-eat cereal.

The invention also relates to a method for manufacturing a ready-to-eat cereal product of the invention. The method includes the steps of mixing particles and/or flakes of the psyllium husk containing intermediate product of the invention, one or more cereal products, and milk solids to provide a dry mixture; mixing sugar, oil or fat, and water to provide a syrup base; mixing the dry mixture and syrup base to form an agglomerated mass; and drying the agglomerated mass to provide the ready-to-eat cereal product. The dry mixture and syrup base may be mixed in a ratio of from about 1:2 to 2:3. The syrup base may include sugar in an amount of about 15 to 40 parts by weight of the syrup, oil or fat in an amount of about 10 to 30 parts by weight of the syrup, water in an amount of about 8 to 30 parts by weight of the syrup. The sugar base may also include sodium chloride in an amount of from about 0.5 to 1.5 parts by weight of the syrup. The agglomerated mass may be dried to a residual water content of from about 1 to 4 percent by weight of the agglomerated mass. The process may further include reducing the size of the agglomerated mass to a size of from about 5 to 15 mm.

DETAILED DESCRIPTION OF THE PREFERRED EMBODIMENTS

It has surprisingly been found that it is possible to provide a cooked-extruded psyllium husk containing intermediate product which comprises from about 84 to 96 percent by weight psyllium husk and which is suitable for manufacturing a ready-to-eat cereal end product that may be eaten as such or may be added to a light meal such as a muesli or a yogurt, for example.

Any form of psyllium husk may be used in the psyllium husk containing intermediate product. It is generally believed by those of ordinary skill in the art that the active ingredient of psyllium is the psyllium seed gum, which is located primarily in the seed husk. Thus, the ground seed husk is primarily used as the source of psyllium, however, the whole seed as well as the dehusked seed may be used. Preferably, the psyllium husk is in powdered form.

The psyllium husk containing intermediate product comprises up to about 8 percent oil or fat. Preferably the psyllium husk containing intermediate product comprises at least 1 to 7 percent and more preferably at least 2 to 5 percent oil or fat. The oil or fat may be any oil or fat that acts as lubricating agent in the cooking-extruding process. Preferably, the oil of fat is butter oil vegetable, or a mixture thereof.

The term "cereal bran," as used herein means the external part of the cereal grain that is rich in fiber. The psyllium husk containing intermediate comprises up to about 10 percent cereal bran. Preferably at least about 1 to 9 percent cereal bran and more preferably at least about 2 to 8 percent cereal bran is used. Any cereal bran may be used in the psyllium husk containing intermediate product. Preferably, the cereal bran is wheat, barley, oat, rice bran, corn bran, bran concentrate, or a mixture thereof. The most preferred cereal bran is oat bran because it is rich with soluble fiber The term "vegetable binder," as used herein means any flour or starch. Generally, the type that typically forms the inner part of a cereal grain is used. The psyllium husk containing intermediate product comprises up to about 10 percent vegetable binder. Preferably the psyllium husk containing intermediate product comprises at least about 1 to 8 percent, more preferably at least about 2 to 6 percent of vegetable binder. Vegetable binders suitable for use in the psyllium husk containing intermediate product include, but are not limited to, flour, especially a cereal or carob seed germ flour; a starch, especially a native starch from wheat, barley, rice, tapioca, potato and/or corn; maltodextrin; a vegetable gum such as gum arabic, guar gum and/or gum carrageenan; or a mixture thereof.

A stabilizer against the effects of oxygen is also used. Preferably disodium phosphate is present in the psyllium husk containing intermediate as the stabilizer. The amount of stabilizer is up to about 1.5 percent by weight of the psyllium husk intermediate intermediate, preferably at least about 0.25 percent and more preferably at least about 0.5 percent by weight of the psyllium husk intermediate.

The psyllium husk containing intermediate product may further comprise additional additives including, but not limited to vitamins, minerals, sodium chloride, antioxidants, and mixtures thereof. These are utilized in conventional amounts.

Preferably, the psyllium husk containing intermediate product is prepared by first mixing together the powdery components to obtain a dry mix and then mixing together the dry mix with the liquid or fluid components. The dry mix and liquid mix may be mixed together in the first mixing section of a traditional food extruder, preferably a twin screw extruder. The resulting mixture may then be cooked in subsequent sections of the extruder where the mixture is heated, compressed, and sheared so that it forms a cooked thermoplastic mass. The thermoplastic mass is then extruded through the openings of a die provided for at an end of the extruder. The extruder may be a single screw or twin screw extruder. The die may have, for example, one or more circular openings having a of from about 2 to 5 mm in diameter. The thermoplastic mass is extruded through the die into an open space at ambient temperature and at atmospheric pressure.

Typically, the extruded strand of thermoplastic mass expands to a significant amount when exiting from the die. The expansion, however, is restricted by providing the oil or fat in the mixture to be cooked-extruded.

The extruded strand of expanded thermoplastic mass may be cut into pieces with a cutter having two or more blades rotating adjacent to the die openings, for example. The resulting pieces may be flaked by rolling, namely by passing the cut pieces between a pair of rollers, before being dried. The pieces may be dried to a residual water content of from about 0.5 to 6 percent, preferably about 0.75 to 5 percent, and more preferably about 1 to 4 percent by weight. The pieces may be dried by any method available to those or ordinary skill in the art, including, but not limited to, drying on a belt dryer, with hot air.

The psyllium husk containing intermediate product may be used to prepare a ready-to-eat cereal product. The ready-to-eat cereal product comprises agglomerated particles and/or flakes of psyllium husk containing intermediate product, one or more cereal products, and milk solids which are coated with a syrup comprising sugar and vegetable oil or fat to agglomerate the particles and cereal products.

The term "cereal product," as used herein, means any bulk cereal ingredients well known to those of ordinary skill in the art including, but not limited to, whole grain products such as corn, oats, whole wheat, barley, rice, and rye; grain components such as the germ and/or bran of any of the aforementioned grains, the flours of these grains, and starches derived therefrom. Any edible component of the grain is included within the term cereal product. The further cereal product may be a cooked-extruded, expanded, or flaked cereals.

The term "milk solids," as used herein, means the solids obtained from animal or vegetable milk. These milk solids are easily obtained by removal of the liquid phase of the milk. Typically, the solids of cow milk are used although those derived from soy ,ilk are also suitable. Preferably, the milk solids are a skimmed milk powder, a demineralized whey powder, or a combination thereof.

The ready-to-eat product may comprise, in parts by weight, from about 10 to 60 parts, preferably about 20 to 50 parts of psyllium husk containing intermediate product; from about 10 to 60, preferably about 20 to 50 parts of one or more cereal products; from about 2 to 20, preferably about 5 to 15 parts of milk solids; from about 10 to 50, preferably about 15 to 40 parts of sugar; and from about 5 to 40, preferably about 10 to 30 parts of vegetable oil or fat.

The sugar and vegetable oil or fat are the main components of the syrup that is used to agglomerate the particles and/or flakes of psyllium husk containing intermediate product, the one or more cereal products, and the milk solids with each other.

Preferably, the sugar is sucrose, dextrose, fructose, or a mixture thereof.

Preferably, the vegetable oil or fat is a relatively high melting fat or blend of vegetable oil or fat. Representative, vegetable oil or fat that is useful in the ready-to-eat product of the invention include, but are not limited to, palm kernel fat, coconut fat, or a mixture thereof.

The syrup may further comprise one or more additional additives including, but not limited to flavors and aromas such as vanillin, antioxidants, sodium chloride, and emulsifiers such as soya lecithin, for example.

The ready-to-eat cereal product may be prepared by preparing a dry mixture of particles and/or flakes of psyllium husk containing intermediate product, one or more cereal products, and milk solids; agglomerating the particles and/or flakes by mixing the dry mixture with a syrup base comprising sugar, vegetable oil or fat, and water to produce agglomerates of a ready-to-eat cereal product; and drying the agglomerates.

The syrup base may be prepared by mixing together from about 10 to 50, preferably about 15 to 40 parts of sugar; from about 5 to 40 parts, preferably about 10 to 30 parts of vegetable oil or fat; and from about 6 to 30 parts, preferably 8 to 24 parts of water. One or more additional additives including, but not limited to flavoring and aromas such as vanillin, antioxidants, sodium chloride, and emulsifiers may also be added to the syrup base. For example, from about 0.1 to 2 parts, preferably about 0.5 to 1.5 parts of sodium chloride may be added to the syrup base.

Any means readily available to those of ordinary skill in the art may be used to mix the dry mixture of particles and/or flakes with the syrup base including, but not limited to a screw mixer of the helical spring type with an axial sprinkling nozzle or a coating drum.

Preferably, the dry mixture and the syrup are combined in a proportion of from about 1/3 to 2/5 syrup with about 3/5 to 2/3 dry mixture.

The resulting agglomerated product may be dried to a residual water content of from about 0.5 to 6 percent, preferably about 0.75 to 5 percent, and more preferably about 1 to 4 percent by weight. The agglomerated product may be dried by any method available to those or ordinary skill in the art, including, but not limited to, drying on a belt dryer, with hot air.

The agglomerates may be reduced in size by passing through a sieve. The sieve may have a mesh size of from 5 to 15 mm, for example.

The resulting ready-to-eat product may be packaged in a package that provides protection against humidity, such as a packing made from a film of aluminum foil, for example.

EXAMPLES

The following examples are given as illustration of embodiments of the psyllium husk containing intermediate product and its manufacturing process, as well as of the ready-to-eat cereal product containing the intermediate product and its manufacturing process. The examples are representative, and they should not be construed to limit the scope of the invention in any way. All parts and percentages are by weight.

Example 1

A psyllium husk containing intermediate product was manufactured by preparing a mixture having the following composition, (in parts by weight, except added water):

| Ingredient | Amount |
| --- | --- |
| Psyllium husk fine powder | 88 |
| Oat bran concentrate | 6 |
| Carob seed germ flour | 5.5 |
| Disodium phosphate | 0.5 |

-continued

| Ingredient | Amount |
| --- | --- |
| Sunflower oil | 7.6 |
| Added water, up to a water content of | 27% |

The powders were first mixed together to obtain a dry mix. The dry mix, oil and added water were then mixed together in the extruder. The resulting mixture was then cooked-extruded with the aid of a BC-45H type CLEXTRAL twin screw extruder having a screw diameter of 55 mm and a total processing length of 800 mm. Cooking-extruding was carried out for 30 seconds at 180° C. and 14 MPa pressure, with the two intermeshing screws rotating at 300 rpm. The cooked thermoplastic mass obtained in this way was extruded through a die having two circular openings with a diameter of 2.5 mm. The thermoplastic mass was extruded into ambient air and immediately cut with a four blade cutter rotating adjacent to the die openings at 4500 rpm. The resulting particles were flaked between a pair of rollers to provide particles having a thickness of about 0.8 mm. The flakes were then dried with hot air on a belt dryer to a residual water content of 1.4 percent and cooled.

Example 2

A ready-to-eat cereal product containing the psyllium husk intermediate product of Example 1 was prepared using a syrup which had the following composition (parts):

| Ingredients | Amount |
| --- | --- |
| Sucrose | 21.35 |
| Vegetable oil blend | 14 |
| Sodium chloride | 0.5 |
| Vanillin | 0.05 |
| Soya lecithin | 0.05 |
| Citric acid | 0.05 |
| Water | 8 |

The components of the syrup were combined and mixed in a double walled tank while being heated to about 50° C.

34 parts of psyllium husk containing intermediate product flakes of Example 1, 26 parts of thin oat flakes, and 6 parts of demineralized whey powder were combined and mixed to provide a dry mixture. The dry mixture was mixed with 44 parts of syrup by means of a coating drum or tumbler. The resulting agglomerates were then dried with hot air on a belt dryer to a residual water content of 2 percent and the dried agglomerates were slightly reduced in size by passing through a sieve which had a mesh size of 8 mm. The ready-to-eat product was eventually bulk packed in a packing made from a film of aluminum foil.

The ready-to-eat product had a chewy texture and an appetizing taste. They could be eaten as such or could be added to a muesli or a yogurt.

What is claimed is:

1. A ready-to-eat cereal product comprising agglomerated particles and/or flakes of one or more cereal products, milk solids coated with a syrup comprising sugar and an oil or fat, and a psyllium husk intermediate composition comprising a cooked-extruded mixture of psyllium husk in an amount of from about 84 to 96 percent by weight of the psyllium husk intermediate composition, oil or fat in an amount of from about 1 to 8 percent by weight of the psyllium husk intermediate composition, cereal bran in an amount of from about 1 to 10 percent by weight of the psyllium husk intermediate composition, vegetable binder in an amount of from about 1 to 10 percent by weight of the psyllium husk intermediate composition, and a stabilizer against oxidation in an amount of from about 0.25% to 1.5% by weight of the psyllium husk intermediate composition.

2. The ready-to-eat cereal product of claim 1, wherein one or more cereal products comprises one or more of the whole grain, the germ, the bran, the flour, or starch derived from corn oats, whole wheat, barley, rice, and rye; the milk solids comprise one or more of skim milk powder and demineralized whey; the sugar comprises one or more of sucrose, dextrose, and fructose; and the oil or fat comprises one or more of palm kernel fat and coconut fat.

3. The ready-to-eat cereal product of claim 1, further comprising one or more additives selected from the group consisting of vitamins, minerals, sodium chloride, and antioxidants.

4. The ready-to-eat cereal product of claim 1, wherein the psyllium husk containing intermediate product is present in an amount of from about from about 20 to 50 parts by weight of the ready-to-eat cereal, the one or more cereal products is present in an amount of from about 20 to 50 parts by weight of the ready-to-eat cereal, the milk solids are present in an amount of from about 5 to 15 parts by weight of the ready-to-eat cereal, the sugar is present in an amount of from about 15 to 40 parts by weight of the ready-to-eat cereal, and the oil or fat is present in an amount of from about 10 to 30 parts by weight of the ready-to-eat cereal.

5. A method for manufacturing a ready-to-eat cereal product comprising:

mixing particles and/or flakes of the psyllium husk containing intermediate composition comprising a cooked-extruded mixture of psyllium husk in an amount of from about 84 to 96 percent by weight of the psyllium husk intermediate composition, oil or fat in an amount of from about 1 to 8 percent by weight of the psyllium husk intermediate composition, cereal bran in an amount of from about 1 to 10 percent by weight of the psyllium husk intermediate composition, vegetable binder in an amount of from about 1 to 10 percent by weight of the psyllium husk intermediate composition, and a stabilizer against oxidation in an amount of from about 0.25% to 1.5% by weight of the psyllium husk intermediate composition, one or more cereal products, and milk solids to provide a dry mixture;

mixing sugar, oil or fat, and water to provide a syrup base;

mixing the dry mixture and syrup base to form an agglomerated mass; and drying the agglomerated mass to provide a ready-to-eat cereal product.

6. The process of claim 5, wherein the dry mixture and syrup base are mixed in a ratio of from about 1:2 to 2:3.

7. The process of claim 5, wherein the syrup base comprises sugar in an amount of about 15 to 40 parts by weight of the syrup, oil or fat in an amount of about 10 to 30 parts by weight of the syrup, water in an amount of about 8 to 30 parts by weight of the syrup.

8. The process of claim 7, wherein the sugar base further comprises sodium chloride in an amount of from about 0.5 to 1.5 parts by weight of the syrup.

9. The process of claim 5, wherein the agglomerated mass is dried to a residual water content of from about 1 to 4 percent by weight of the agglomerated mass.

10. The process of claim 5, further comprising reducing the size of the agglomerated mass to a size of from about 5 to 15 mm.

\* \* \* \* \*